Aug. 19, 1924.

J. A. SERRELL 1,505,292

LIQUID SUPPLY CONTROLLING APPARATUS

Filed July 18, 1923    2 Sheets-Sheet 1

INVENTOR
John A. Serrell
BY
ATTORNEY

Aug. 19, 1924. 1,505,292
J. A. SERRELL
LIQUID SUPPLY CONTROLLING APPARATUS
Filed July 18, 1923 2 Sheets-Sheet 2

INVENTOR
John A. Serrell
BY
ATTORNEY

Patented Aug. 19, 1924.

1,505,292

UNITED STATES PATENT OFFICE.

JOHN A. SERRELL, OF NORTH PLAINFIELD BOROUGH, NEW JERSEY.

LIQUID-SUPPLY-CONTROLLING APPARATUS.

Application filed July 18, 1923. Serial No. 652,292.

*To all whom it may concern:*

Be it known that I, JOHN A. SERRELL, a citizen of the United States of America, residing at borough of North Plainfield, Somerset County, New Jersey, have invented a new and useful Liquid-Supply-Controlling Apparatus, of which the following is a specification.

My invention relates to apparatus for controlling the supply of liquids and more particularly to liquid metering and mixing apparatus.

One object is to limit the possible supply of liquid to measuring or mixing apparatus to the amount which such apparatus can properly accommodate.

Another object is to maintain a relatively uniform flow of liquid through the metering or mixing apparatus even under conditions of irregular supply to or demand from such apparatus.

Another object is to provide a liquid mixing system in which the liquids are accurately proportioned by weight rather than by volume so that changes in temperature have no effect on the proportioning of the liquids.

This application is in part a continuation and in part a division of my co-pending application Serial No. 318,605 filed August 19th, 1919.

In its most complete form my invention employs a primary receiver for one liquid, a storage receiver into which liquid is allowed to flow from the primary receiver and, in case mixing is desired, a secondary receiver to hold the liquid to be mixed. Where the demand for liquid from the storage receiver is not uniform I provide an automatic valve between the primary receiver and the storage receiver to regulate the flow from the former to the latter so as to maintain an approximately constant quantity of liquid in the storage receiver. In cases of sudden large demand on the storage receiver, however, the automatic regulating valve might open so wide as to permit a greater flow than could be efficiently measured by the meter between the automatic valve and the storage receiver, or the flow might be so great as to exceed the capacity of the mixer for the secondary liquid. I therefore provide a static head trap between the primary and storage receiver to positively limit the rate of flow of liquid therebetween. While such a head trap is useful in connection with any type of liquid flow meter, I consider the combination of my static head trap with a meter comprising a V-notch weir box and scale mechanism for weighing and recording liquid momentarily in the weir box particularly desirable. This head trap meter combination works very well with a secondary liquid supplying means which may be accurately and automatically controlled in response to the weight of liquid passing through the weir box.

Figure 1:
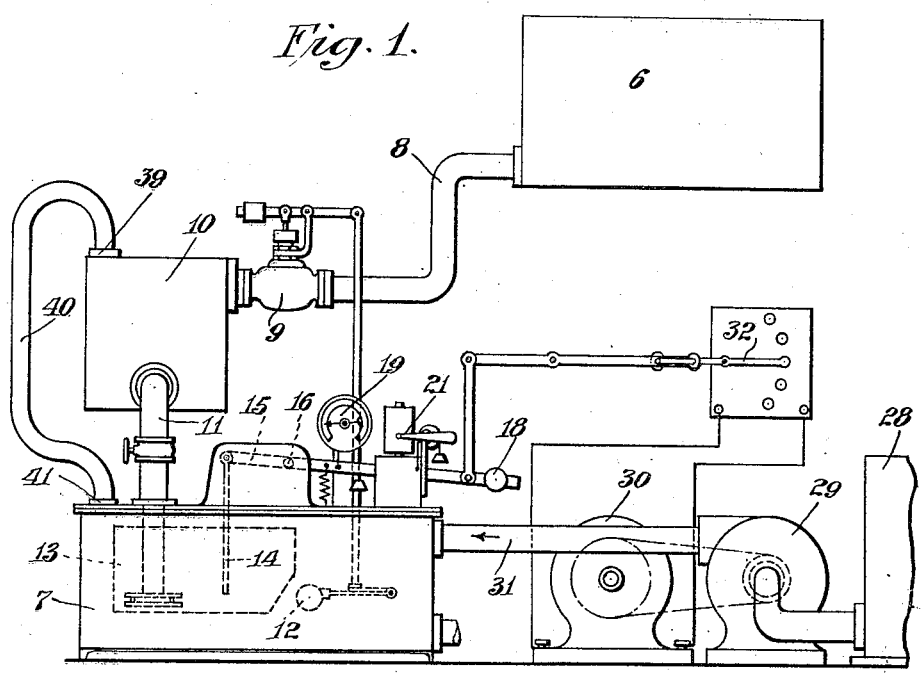
Fig. 1 is a diagrammatic side elevation of a complete system for carrying out my invention.

A primary receiver 6 is supplied with liquid which might be condenser water or any other liquid and which may vary in height within the receiver within wide limits. 7 designates a storage receiver or tank to which liquid in the primary receiver flows through pipe 8, valve 9, trap 10 and pipe 11. Valve 9 is automatically controlled by a float 12 in the storage receiver 7 which is arranged to open the valve whenever the liquid level falls and close the valve when the normal level is again attained.

Figure 4:
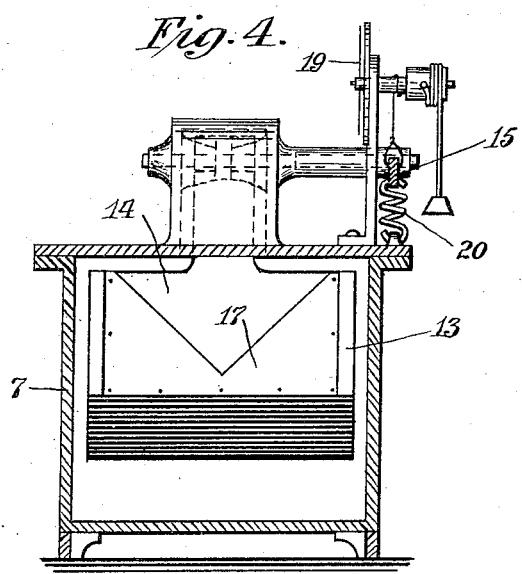
Fig. 4 is a transverse sectional view of the storage receiver, weir box and part of the indicating and recording mechanism of the metering parts.

Within the storage receiver is a weir box 13 suspended for vertical movement as by the link 14 which is carried by the lever 15 pivoted at 16. The weir box is provided at one end with a face plate 17 containing preferably a V-notch as shown in Fig. 4. Primary liquid is admitted to the weir box from pipe 11 by a distributing head 23 which quells the downward momentum of the incoming liquid, the baffle plate 23′ extending transversely across the bottom of the weir box to diminish the velocity of the inflowing liquid. If desired a suitable valve may be inserted in pipe 11 as shown in Fig. 1.

A counterweight 18 is adjustably mounted on lever 15 so that an indicator 19 may be set for zero reading when there is no flow through the notch in the weir box. A spring 20 connects lever 15 to a fixed point so that vertical movement of the weir box will be proportional to the weight of liquid in the weir box above the zero line at the bottom of the notch. In addition to the indicator 19 which records the flow at any moment in any desired unit, a permanent record may be made by a stylus 21 on a card carried by a suitable rotating drum 22, the movement of the stylus being controlled by movement of lever 15 in any desired manner, for example as shown in Fig. 1 or in Fig. 2.

The metering mechanism just described when employing a weir box having a definite V-notch will accurately measure the flow of liquid therethrough only within certain definite limits. For example, if the flow is so great as to overflow the weir box over the edge as well as through the V-notch no accurate record will be made. To prevent such overflow and for other reasons which will appear later I provide between the automatic valve 9 and the weir box a static head trap which limits the head of liquid which can flow through pipe 11 and distributing pipe 23 into the weir box. In the modification shown in Fig. 3 this trap consists of the casing 10 containing a valve 24 mounted on a pivoted lever 25 actuated by a float 26. Obviously when the water level rises to a certain point valve 24 will cut off the flow from primary receiver and the head of liquid at that time will not cause flow in excess of that which can be safely discharged through the V-notch of the weir box. To provide several variable normal flows I may substitute end plates 17 having notches of different sizes and may then adjust the head trap by sliding a weight 27 along the pivoted lever which is linked to valve lever 25, so that a wide range of flow adjustment is possible with my device.

The static head trap is also very desirable where two liquids are to be mixed in definite proportions by my apparatus. In Fig. 1 I have shown apparatus intended to be used where a source of secondary liquid under pressure is not readily available. The secondary liquid is supplied from a secondary tank or receiver 28. I have shown a centrifugal pump 29 driven by an electric motor 30 to pump liquid through pipe 31 into the storage receiver at a rate controlled by the speed of the motor. I may however employ other types of pumps and different sources of power to drive them as occasion demands. Preferably I control the speed of the electric or other motor in accordance with the flow of primary liquid through the weir box. This may be accomplished by using a rheostat or throttling device having an operating arm 32 linked to lever 15 in such a way that movement of the lever caused by increase flow of the primary liquid will speed up the motor and viceversa. Obviously the number of contacts on the rheostat may be varied according to the nicety of adjustment desired. Whatever motor is employed, however, will have a maximum speed which limits the maximum rate of pumping secondary liquid into the storage receiver. For this reason the static head trap 10 is very desirable since it prevents too great flow of primary liquid through the weir box and thus keeps the range of movement of lever 15 and its linkage including rheostat arm 32 within limits which motor 30 and pump 29 are designed to accomodate.

Figure 2:
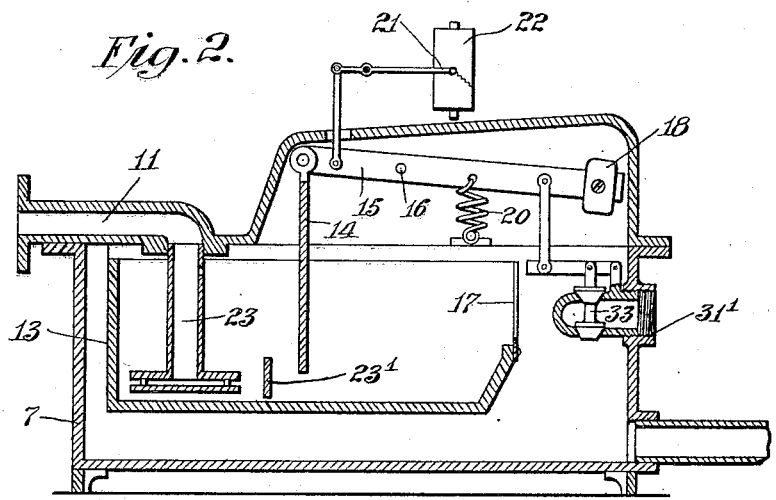
Fig. 2 is a longitudinal vertical section of a recording meter with a valve for automatically controlling the introduction of a secondary liquid into the storage receiver.

When a source of secondary liquid which can be fed by gravity is available I may employ somewhat simpler apparatus such as shown in Fig. 2 to control its admission to the storage receiver. For example, a graduating valve 33 may control an inlet 31' coming from the gravity feed secondary receiver, the valve 33 being directly linked to lever 15 so that increased flow of primary liquid through the weir box automatically and proportionally increases the flow through inlet 31'. Here again the static head trap is important, since without it the flow through the weir box might exceed an amount necessary to fully open valve 33 in which case insufficient secondary liquid would be supplied to maintain the predetermined proportion.

Figure 3:
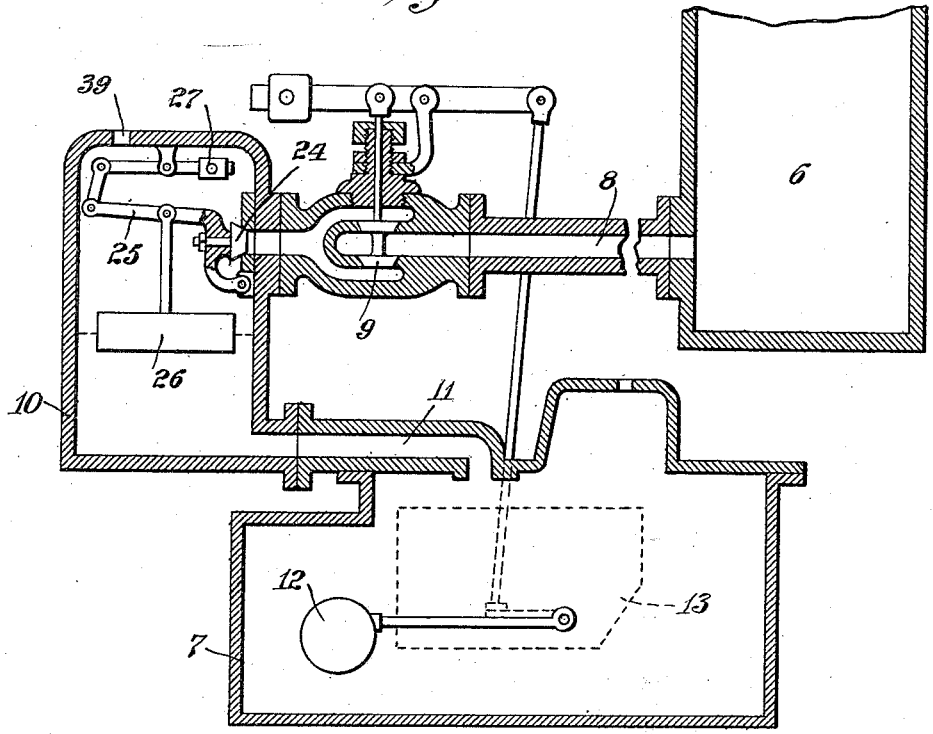
Fig. 3 is a vertical section showing an automatic valve for controlling the flow from the primary receiver to the storage receiver and one form of static head trap for limiting such flow, the measuring parts being omitted for clearness.
Figure 5:
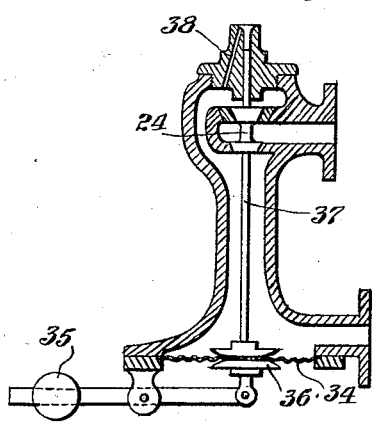
Fig. 5 shows a modified static head trap.

In Fig. 5 I have shown a modification which may be substituted for the head trap shown in Fig. 3 and in which the valve 24 is actuated by a flexible diaphragm 34 instead of by a float. As shown, upon a decrease in the head of liquid within the trap, a weight 35 will raise mushroom 36, diaphragm 34 and valve rod 37 to open valve 24 and restore the proper head. The normal working head may be determined by the position of weight 35. A vent 38 maintains atmospheric pressure within the static head trap in the same manner that vent 39 in trap 10 does so. In either case the vapor vent in the head trap may be connected as by a pipe 40 to a similar vent 41 in the storage receiver 7, or pipe 40 may be omitted and all the vents open to the atmosphere.

It should be noted that when my invention is used to mix two or more liquids, the head in the secondary liquid storage receivers should be kept as nearly constant as practicable when such liquid is to be fed by gravity or by a centrifugal pump, or else a displacement pump should be used.

I claim:

1. Liquid supply controlling apparatus comprising the combination of a primary receiver, a storage receiver, an automatic valve, means controlled by the level of liquid in said storage receiver for operating said valve, a meter delivering into said storage receiver and a static head trap interposed between said valve and said meter.

2. In a system of the character described, a primary receiver, a storage receiver, a valve, means automatically controlled by the level of liquid in said storage receiver for operating said valve and a static head device interposed between said valve and said storage receiver for delivering the liquid thereto at a limited maximum head.

3. In a system of the character described, a primary receiver, a storage receiver, a valve, means automatically controlled by the level of liquid in said storage receiver for operating said valve, a static head device interposed between said valve and said storage receiver for delivering the liquid thereto at a limited maximum head, and means for equalizing the pressure in the static head device and in the storage receiver.

4. Liquid supply controlling apparatus comprising the combination of a primary receiver, a storage receiver, an automatic valve, means controlled by the level of liquid in said storage receiver for operating said valve, a meter delivering into said storage receiver, a static head trap interposed between said valve and said meter and an equalizing pipe connecting the air spaces in the static head device and in the storage receiver.

5. In a system of the character described, a primary receiver, a storage receiver, a static head device interposed between said primary receiver and said storage receiver, an automatic valve controlling the flow of liquid to said static head device and means for controlling the flow of liquid from the static head device to said storage receiver.

6. In a system of the character described, a primary receiver, a static head device receiving its liquid from said receiver, a meter receiving its liquid from the static head device and means interposed between the static head device and said meter for controlling the flow of liquid.

7. In a liquid meter, a weir box, means for continuously weighing the liquid flowing therethrough and means automatically operable by said weighing means for controlling the introduction of a secondary liquid in proportion to the weight of liquid passing through the weir box.

8. In a liquid meter, a suspended weir box, a scale mechanism for weighing the liquid passing therethrough and means operable thereby for controlling the introduction of a secondary liquid in proportion to the weight of liquid passing through the weir box.

9. In a liquid supply system, a primary receiver, a storage receiver, a meter for measuring the liquid passing into said storage receiver, a static head device receiving its liquid from said storage receiver for controlling the flow of liquid from the primary receiver to the meter and means operated by the meter for controlling the introduction of a secondary liquid.

10. In a liquid supply system, a primary receiver, a storage receiver connected to said primary receiver, means for continuously weighing the liquid flowing into said storage receiver from the primary receiver and automatic means for controlling the introduction of a secondary liquid into said storage receiver in proportion to the weight of liquid flowing through said meter.

11. In a liquid supply system, a primary receiver, a storage receiver, means for continuously weighing the liquid flowing into said storage receiver from the primary receiver and automatic means for controlling the introduction of a secondary liquid into said storage receiver in proportion to the weight of liquid flowing through said meter, said means including a pump whose delivery is automatically controlled by said meter.

12. Liquid supply controlling apparatus comprising a source of liquid, a storage receiver and a static head trap between said source and said receiver, said trap comprising a chamber having a bottom wall, an inlet valve, and means operable in response to changes in the head of liquid acting on said bottom wall for actuating said valve.

13. Liquid supply controlling apparatus comprising a source of liquid, a storage receiver and a static head trap between said source and said receiver, said trap comprising a chamber having an inlet port near the top and an outlet port near the bottom, an inlet valve and an outlet valve to control said ports, and means operable in response to changes in the head of liquid in the chamber for actuating said inlet valve to tend to maintain said head at a predetermined value, said means being adjustable to vary the predetermined value of said head.

14. Liquid supply controlling apparatus comprising a source of liquid, a storage receiver and a static head trap between said source and said receiver, said trap comprising a chamber having an inlet port near the top and an outlet port near the bottom, an inlet valve and an outlet valve to control said ports, and means operable in response to changes in the head of liquid in the chamber for actuating said inlet valve to tend to maintain said head at a predetermined value, said outlet valve being adjustable to vary the normal rate of liquid flow from said chamber to said storage receiver.

15. Liquid supply controlling apparatus comprising a source of liquid, a storage receiver and a static head trap between said source and said receiver, said trap comprising a chamber having an inlet port near the top and an outlet port near the bottom, an inlet valve and an outlet valve to control said ports, and means operable in response to changes in the head of liquid in the chamber for actuating said inlet valve to tend to maintain said head at a predetermined value, said means being adjustable to vary the predetermined value of said head, and said outlet valve being adjustable whereby the flow may be regulated within wide limits by adjusting one or more of said adjustable parts.

16. Liquid supply controlling apparatus comprising a source of liquid, a storage receiver and a static head trap between said source and said receiver, said trap comprising a chamber having a bottom wall, an inlet valve, and linkage including a pivoted lever having a slidable weight to variably operate said valve according to the head of liquid in the chamber and the position of the weight on the lever.

17. Liquid supply controlling apparatus comprising a source of liquid, a storage receiver and a static head trap between said source and said receiver, said trap comprising a chamber having a flexible diaphragm below the normal water level, an inlet valve mounted for operation by movement of the diaphragm, and means including a pivoted lever to regulate movement of the diaphragm.

18. Liquid supply controlling apparatus comprising a source of liquid, a storage receiver and a static head trap between said source and said receiver, said trap comprising a chamber having a flexible diaphragm below the normal water level, an inlet valve mounted for operation by movement of the diaphragm, and means including a pivoted lever to regulate movement of the diaphragm, and means for applying a variable force to said lever to adjust the normal tension of the diaphragm.

JOHN A. SERRELL.